United States Patent [19]

Surzhenko et al.

[11] 4,288,491
[45] Sep. 8, 1981

[54] LAMINATED PLASTIC MATERIAL

[76] Inventors: Evgeny M. Surzhenko, ulitsa Shkolnaya, 8, kv. 7; Bronislav F. Basilaev, prospekt Tukhachevskogo, 37, kv. 66; Roman V. Molotkov, Vladimirsky prospekt, 7, kv. 23; Alexandr S. Madorsky, Piskarevsky prospekt, 40, kv. 273; Grigory B. Shalun, Zanevsky prospekt, 35, kv. 71; Valentina B. Golynkina, Piskarevsky prospekt, 48, kv. 5; Margarita A. Ershova, Tallinskaya ulitsa, 27, kv. 26; Irina P. Eliseeva, prospekt Energetikov, 30, korpus 1, kv. 383; Nina E. Trukhtenkova, prospekt K. Marxa, 72, kv. 51; Sergei M. Gurylev, Sestroretsk ulitsa Volodarskogo, 13, kv. 3; Diana L. Kopetskaya, naberezhnaya Fontanki, 90, kv. 5; Evgeny Y. Pechko, Krasnoe Selo, Fabrichny poselok, 4, kv. 7; Albert S. Khlamenko, Krasnoe Selo, Fabrichny poselok, 2, kv. 36; Viktor V. Magnitsky, Krasnoe Selo, Fabrichny poselok, 5, kv. 17, all of Leningrad, U.S.S.R.

[21] Appl. No.: 20,080

[22] Filed: Mar. 13, 1979

[51] Int. Cl.³ .................. B32B 27/42; B32B 23/06
[52] U.S. Cl. .................... 428/332; 428/339; 428/525; 428/530; 428/531; 428/535; 428/921
[58] Field of Search ............ 428/530, 921, 332, 339, 428/531, 535, 525

[56] References Cited

U.S. PATENT DOCUMENTS

| 3,202,567 | 8/1965 | Muri et al. | 428/530 |
| 3,410,750 | 11/1968 | Wohnsiedler | 428/530 |
| 4,150,188 | 4/1979 | Brulet | 428/530 |

OTHER PUBLICATIONS

Hackh's Chemical Dictionary, pp. 54 and 450, 4th Ed., Sep. 77, McGraw Hill Book Co.

Primary Examiner—Thomas J. Herbert, Jr.
Attorney, Agent, or Firm—Burton L. Lilling

[57] ABSTRACT

A laminated plastic material comprises surface layers of paper impregnated with amino formaldehyde resin and inner layers of paper containing a flame retardant material and impregnated with phenol formaldehyde resin. The flame retardant material is a product of interaction of an aluminum or copper compound with phosphoric acid and nitrogen bases and contains, in weight percent:

| $P_2O_5$ total | 37 to 63 |
| $P_2O_5$ water-soluble | 0 to 6 |
| $NH_3$ | 3.5 to 11 |
| MO | 18 to 43 | where MO is at least one metallic oxide, the flame retardant material content ranging from 4 to 8 weight percent, with the following ratio of the laminated plastic components, in weight percent:

| paper for surface layers | 9 to 26 |
| paper for inner layers | 26 to 49 |
| phenol-formaldehyde resin | 16 to 30 |
| amino-formaldehyde resin | 5 to 26 |

7 Claims, No Drawings

LAMINATED PLASTIC MATERIAL

FIELD OF THE INVENTION

The present invention relates to the field of plastic production, and more particularly to fabrication of laminated plastic material.

The invention can be most advantageously used under conditions of increased fire hazard, namely in aircraft, shipbuilding, carriage building etc., where laminated plastics are applied as facing or construction-facing materials.

BACKGROUND OF THE INVENTION

When used in the fields indicated above, laminated plastic material must possess a number of features the most important of which are fire resistance, strength, water resistance, thermostability, abrasive resistance of the surface, and provision of high-quality decorative facing.

Known in the art (cf. the USSR Inventor's Certificate No. 269,476, Int. Cl. B29a) is a laminated plastic of the following composition in weight percent:

| | |
|---|---|
| paper for outer layers | 21.0 |
| paper for inner layers | 37.0 |
| phenol-formaldehyde resin | 13.8 |
| urea-formaldehyde resin | 22.2 |
| phosphoric acid | 6.0 |

The disadvantage of such plastic material evident in the process of its fabrication is that phosphoric acid used as a flame retardant material makes the process of impregnating papers with resins and that of drying the impregnated papers difficult. The disadvantage evident in application of the plastic of such a composition is its combustibility index K ranging from 1.2 to 1.3.

The fire resistance of laminated plastic is known to be dependent mainly on the presence of a flame retardant material in its composition, on the amount and chemical composition of the flame retardant material introduced, on the composition of binding agents, as well as on the thickness and components of the plastic.

The extent of fire resistance of a material might be evaluated by its combustibility index (K) using the calorimetric method.

The combustibility index (K) is determined as a ratio of the amount of heat released during the combustibility test to that obtained by the sample from the firing source during the test period.

Following such method, materials may be classified by fire resistance according to their K values as

| | |
|---|---|
| combustible | K above 2.1 |
| hard-to-inflame | K ranging of 0.5 to 2.1 |
| hard-to-burn | K ranging of 0.1 to 0.5 |
| incombustible | K below 0.1 |

Under the conditions of increased fire hazard, a plastic material having a combustibility index of not above 0.5 should be used.

The extent of fire resistance ensured by the above method is directly dependent upon the plastic material's thickness. Thus the thickness decrease results in changes among the plastic components, i.e. number of the plastic inner layers becomes lower. Fireproofing of thin plastics is difficult to attain, however a decrease in thickness is necessary to lower the weight of construction details covered with laminated plastic material.

Strength of a plastic material is known to be determined by the value of its bending strength at failure, which should be no less than 1,000 $kgf/cm^2$.

Water resistance of a plastic is known to be determined by the type of binding material used for protective layers, by the grade of paper impregnation, and by extent of the binding agent solidification in the process of pressing. Water absorption for a period of 24 hours usually is not above 4 to 6%, according to the thickness of the plastic material. In addition, a plastic material must withstand 1-hour boiling in water without formation of any swelling or stratification, thus featuring the grade of paper impregnation with the binding agent and the necessary extent of its solidification.

Thermostability and wear resistance of a plastic surface is known to be determined by the type of binding agent used for protective layers. Thus, the plastic based on melamine-formaldehyde resin is shown to have higher wear resistance and thermostability characteristics as compared to those of the plastic based on urea-melamine-formaldehyde resin, which makes it possible to classify it as hard-to-inflame.

Also known in the art is a laminated plastic material (cf. the book "Fireproofing of Wood Boards and Laminated Plastics" by A. A. Leonovitch et al. Moscow, Publishing House "Lesnaya Promyshlennost", 1974, pp. 98-115) composed of surface layers of paper, amino-formaldehyde resin and inner layers of paper including flame retardant material, and phenol formaldehyde resin.

Ferriammonium phosphate used as the flame retardant material in this type of laminated plastic enters into the composition of the paper for inner layers.

Indicated components enter into the composition of the laminated plastic in the following ratio (weight percent):

| | |
|---|---|
| paper for surface layers | 15 to 22 |
| paper for inner layers | 30 to 37 |
| urea-melamine-formaldehyde resin | 16 to 22 |
| phenol-formaldehyde resin | 20 to 25 |
| flame retardant material | 6 to 7 |

Such a composition ensures a laminated plastic of 2 to 3 mm thick.

Disadvantages of the plastic laminate mentioned above are as follows. It has a combustibility index K ranging from 1.2 to 1.4, i.e. the plastic falls into the category of the hard-to-inflame materials. Therefore such plastic laminate is of limited application, in particular its use being unadvisable under the conditions of increased fire hazard. In addition, the above described laminated plastic cannot be provided with a thickness of below 2 mm in case its fireproof characteristics are to be retained, since otherwise inadequate efficiency of ferriammonium phosphate as the flame retardant material would result in a combustibility index of greater than 2.1 thus causing the plastic to fall into the category of combustible materials.

SUMMARY OF THE INVENTION

It is an object of the present invention to provide a laminated plastic material possessing an increased fire resistance while maintaining the required physical-and-mechanical and waterproof characteristics.

Another object of the present invention is to provide a fire-resistant laminated plastic material having a reduced thickness while maintaining the required physical-and-mechanical and waterproof characteristics.

With these and other objects in view, there is proposed a laminated plastic material consisting of the surface layers composed of paper and amino-formaldehyde resin and the inner layers composed of paper containing a flame retardant material and phenol-formaldehyde resin, which plastic laminate, according to the invention, features the following composition, in weight percent:

| paper for surface layers | 9 to 26 |
| paper for inner layers | 26 to 49 |
| phenol-formaldehyde resin | 16 to 30 |
| aminoformaldehyde resin | 5 to 26 |
| flame retardant material | 4 to 8, | where the flame retardant material represents a product of interaction of aluminum or copper compounds with phosphoric acid and nitrogen bases, containing (in weight percent):

| $P_2O_5$ total | 37 to 63 |
| $P_2O_5$ water-soluble | 0 to 6 |
| $NH_3$ | 3.5 to 11 |
| MO | 18 to 43 | where MO is at least one metallic oxide.

The reduction of the flame retardant material content to below 4% fails to provide the desired fire resistance of the plastic laminate, whereas the increase of the flame retardant material content to above 8% results in worsened physical-and-mechanical, as well as waterproof characteristics of the plastic laminate.

An advantage of the invention consists in that due to the flame retardant material of above composition the laminated plastic has a combustibility index K in the range of 0.1 to 0.5 which conforms to the category of hard-to-burn materials, according to the calorimetric method used to evaluate fireproof characteristics of the plastic laminate. The improved fire resistance of the proposed laminated plastic can be accounted for by the fact that, when exposed to the effect of elevated temperatures, the flame retardant material is decomposed releasing the decomposition products which prevent the flame from spreading over the paper and thermoreactive resin.

Another advantage of the proposed laminated plastic is the possibility of reducing its thickness, while retaining its physical-and-mechanical, water-proof and decorative characteristics.

The indicated limits imposed on the contents of total phosphorus pentoxide and metallic oxides are defined by chemical composition of the flame retardant material. An increase in the content of water-soluble phosphorus pentoxide to above 6 weight percent results in drastic deterioration of fire-proof and water-proof characteristics of the plastic. The ammonia content of less than 3.5 weight percent results in unsatisfactory fireproof characteristics of the plastic, while the upper limit of the ammonia content is limited by the chemical composition of the flame retardant material. The ammonia content of above 3.5 weight percent ensures improved fireproof characteristics of the flame retardant material.

Amino-formaldehyde resin should be preferably in the form of melamine-formaldehyde resin.

The use of melamine-formaldehyde resin in combination with antipyrene of the proposed composition provides further reduction of the thickness of the fireproof laminated plastic, and improves its operational characteristics, such as abrasive resistance, water resistance and thermostability.

It is advisable that a product of interaction of nepheline with phosphoric acid and nitrogen bases be used as the flame retardant material.

This ensures a cheaper process for manufacturing paper for inner layers of the plastic and as a result reduces the production cost of the plastic.

Adoption of the present invention on industrial scale does not require any revision of the technological processes for fabrication of paper and laminated plastic.

The fire resistance of the proposed plastic is three times greater than that of the known plastic, while retaining main water-proof and mechanical strength characteristics. In addition, the proposed plastic laminate is non-toxic both under service conditions and when exposed to heat.

Thus, possessing necessary physical-and-mechanical and water-proof characteristics the proposed laminated plastic falls into the category of hard-to-burn materials ($K<0.5$) and can be fabricated with a wide range of thickness, consequently meeting the requirements for aircraft and shipbuilding applications.

Melamine-formaldehyde resin used to impregnate surface layers of the plastic, in combination with a novel-type of flame retardant material employed in the paper for inner layers made it possible to produce a hard-to-burn plastic of 1 mm thick. Besides, nepheline flame retardant material having slightly worse fire-resistant characteristics may be used together with melamine-formaldehyde resin.

The use of nepheline flame retardant material ensures both a more efficient technological process of manufacturing paper and plastic and a low production cost of the plastic laminate.

Nepheline flame retardant material is a product of interaction of nepheline with phosphoric acid and nitrogen bases.

These and other objects, as well as advantages of the present invention will be more apparent from the following detailed description of the embodiment thereof.

DETAILED DESCRIPTION OF THE INVENTION

According to the invention, the laminated plastic material is manufactured using an established practice of making up packs of paper sheets previously impregnated with synthetic thermoreactive resins and compressing the packs between polished steel plates at a temperature of 135° to 150° C. and under pressure of 100 kg/cm$^2$ for 4 to 6 min per 1 mm of the plastic thickness, followed by cooling to 50° C. under pressure. Paper impregnated with amino-formaldehyde resin is intended for using as an outer decorative layer of the plastic. The inner layers are made of paper containing finely dispersed water-insoluble flame retardant material and phenol-formaldehyde resin. As the flame retardant material a product is used resulting from interaction of aluminum or copper compounds with phosphoric acid and nitrogen bases and containing, in weight percent:

| | |
|---|---|
| P$_2$O$_5$ total | 37 to 63 |
| P$_2$O$_5$ water-soluble | 0 to 6 |
| NH$_3$ | 3.5 to 11 |
| MO | 18 to 43 | where MO is at least one metallic oxide.

Paper impregnated with amino-formaldehyde resin and intended to compensate for the plastic shrinkage and to prevent it from warping is used for the outer compensative layer of the plastic material.

In certain cases, in order to protect the outer decorative layer from the effect of phenol-formaldehyde resin in the process of plastic fabrication, as well as to improve its decorative characteristics and to reduce the cost, a barrier layer made similarly to the compensative one is inserted between the outer decorative layer and the inner layers of the plastic. The decorative, compensative, and barrier (if any) layers form surface layers of the plastic, the total number of paper sheets in the decorative and barrier layers in the pack being equal to that of the compensative layer.

Depending on the required thickness of the laminated plastic, the indicated components are used therein at the following ratio, in weight percent:

| | |
|---|---|
| paper for surface layers | 9 to 26 |
| paper for inner layers | 26 to 49 |
| phenol-formaldehyde resin | 16 to 30 |
| amino-formaldehyde resin | 5 to 26 |
| flame retardant material | 4 to 8 |

The above procedure was used to manufacture several samples of laminated plastic which composition and characteristics can be seen from the examples given below. In all the cases the amino-formaldehyde resin content of the impregnated paper for surface layers of the plastic laminate is 50 weight percent, and the phenol-formaldehyde resin content of the impregnated paper for inner layers is 35 weight percent. By the initial weight of paper is meant the weight of non-impregnated paper.

EXAMPLE 1

A pack was made up of 1 sheet of paper impregnated with urea-melamine-formaldehyde resin and intended for the outer decorative layer, of an initial weight of 160 g/m$^2$ 1 sheet of paper impregnated with urea-melamine-formaldehyde resin and intended for the barrier layer, of an initial weight of 150 g/m$^2$ 5 sheets of paper impregnated with phenol-formaldehyde resin and intended for the inner layers, of an initial weight of 150 g/m$^2$, the paper including a flame retardant material representing a product of interaction of aluminum phosphate with phosphoric acid and urea, containing (in weight percent):

| | |
|---|---|
| P$_2$O$_5$ | 48.4 |
| P$_2$O$_5$ water-soluble | 0 |
| NH$_3$ | 4.75 |
| Al$_2$O$_3$ | 20.7 | the flame retardant material content of the paper being 16.4 weight percent, and 2 sheets of paper impregnated with urea-melamine-formaldehyde resin and intended for the compensative layer, of an initial weight of 150 g/m$^2$.

The laminated plastic material produced using the above process was 1.5 mm thick and had the following composition, in weight percent:

| | |
|---|---|
| paper for surface layers | 26.5 |
| paper for inner layers | 26.0 |
| phenol-formaldehyde resin | 16.5 |
| urea-melamine-formaldehyde resin | 26.0 |
| flame retardant material | 5.0 |

The resulting plastic laminate exhibited the following characteristics:

| | |
|---|---|
| specific gravity | 1.45 g/cm$^3$ |
| water absorption | 2.87% |
| strength limit at static bending | 1,298 kgf/cm$^2$ |
| resistance to boiling in water for one hour | no change in appearance |
| combustibility index K | 0.49 |

EXAMPLE 2

A pack was composed of 1 sheet of paper impregnated with urea-melamine-formaldehyde resin and intended for the outer decorative layer, of an initial weight of 160 g/m$^2$.

1 sheet of paper impregnated with urea-melamine-formaldehyde resin and intended for the barrier layer, of an initial weight of 150 g/m$^2$.

7 sheets of paper impregnated with phenol-formaldehyde resin and intended for the inner layers, of an initial weight of 150 g/m$^2$, the paper including antipyrene representing a product of interaction of aluminum hydroxide with phosphoric acid and urea, containing (in weight percent):

| | |
|---|---|
| P$_2$O$_5$ | 62.0 |
| P$_2$O$_5$ water-soluble | 0.9 |
| NH$_3$ | 5.8 |
| Al$_2$O$_3$ | 19.1 | the flame retardant material content of the paper being 18.3 weight percent, and 2 sheets of paper impregnated with urea-melamine-formaldehyde resin and intended for the compensative layer, of an initial weight of 150 g/m$^2$.

The resulting laminated plastic was 2 mm thick and had the following composition, in weight percent:

| | |
|---|---|
| paper for surface layers | 21.5 |
| paper for inner layers | 30.0 |
| phenol-formaldehyde resin | 19.8 |
| urea-melamine-formaldehyde resin | 21.9 |
| flame retardant material | 6.8 |

The plastic laminate exhibited the following characteristics:

| | |
|---|---|
| specific gravity | 1.45 g/cm$^3$ |
| water absorption | 2.95% |
| strength limit at static bending | 1,764 kgf/cm$^2$ |
| resistance to boiling in water for one hour | no change in appearance |
| combustibility index K | 0.39 |

EXAMPLE 3

A pack was made up of 1 sheet of paper impregnated with melamine-formaldehyde resin and intended for the outer decorative layer, of an initial weight of 160 g/m²
4 sheets of paper impregnated with phenol-formaldehyde resin and intended for the inner layers, of an initial weight of 150 g/cm², the paper including a flame retardant material comprising a product of interaction of cuprous sulphate with phosphoric acid and urea, containing (in weight percent):

| | |
|---|---|
| $P_2O_5$ | 37.1 |
| $P_2O_5$ water-soluble | 0 |
| $NH_3$ | 10.8 |
| CuO | 42.2 | the flame retardant material content of the paper being 10.5 weight percent, and 1 sheet of paper impregnated with melamine-formaldehyde resin and intended for the compensative layer, of an initial weight of 150 g/m².

The resulting laminated plastic was 1 mm thick and had the following composition, in weight percent:

| | |
|---|---|
| paper for surface layers | 22.0 |
| paper for inner layers | 38.0 |
| phenol-formaldehyde resin | 23.0 |
| melamine-formaldehyde resin | 12.4 |
| flame retardant material | 4.6 |

The plastic laminate exhibited the following characteristics:

| | |
|---|---|
| specific gravity | 1.45 g/cm³ |
| water absorption | 2.9% |
| strength limit at static bending | 1.551 kgf/cm² |
| resistance to boiling in water for one hour | no change in appearance |
| combustibility index K | 0.43 |

EXAMPLE 4

A pack was composed of 1 sheet of paper impregnated with melamine-formaldehyde resin and intended for the outer decorative layer, of an initial weight of 160 g/m²
7 sheets of paper impregnated with phenol-formaldehyde resin and intended for the inner layers, of an initial weight of 150 g/m², the paper including a flame retardant material representing a product of interaction of nepheline with phoshoric acid, urea, and melamine, containing (in weight percent):

| | |
|---|---|
| $P_2O$ total | 50.5 |
| $P_2O_5$ water-soluble | 5.7 |
| $NH_3$ | 10.4 |
| $Al_2O_3$, $Fe_2O_2$, $Na_2O$, $K_2O$ and other oxides | 18.7 | the flame retardant material content of the paper being 9.2 weight percent, and 1 sheet of paper impregnated with melamine-formaldehyde resin and intended for the compensative layer, of an initial weight of 150 g/m².

The resulting plastic laminate was 1.5 mm thick and had the following composition, in weight percent:

| | |
|---|---|
| paper for surface layers | 14.7 |
| paper for inner layers | 45.4 |
| phenol-formaldehyde resin | 27.0 |
| melamine-formaldehyde resin | 8.3 |
| flame retardant material | 4.6 |

The plastic laminate exhibited the following characteristics:

| | |
|---|---|
| specific gravity | 1.45 g/cm³ |
| water absorption | 2.8% |
| strength limit at static bending | 1,528 kgf/cm² |
| resistance to boiling in water for one hour | no change in appearance |
| combustibility index K | 0.29 |

EXAMPLE 5

A pack was composed of 1 sheet of paper impregnated with urea-melamine-formaldehyde resin and intended for the outer decorative layer, of an initial weight of 160 g/m²
13 sheets of paper impregnated with phenol-formaldehyde resin and intended for the inner layers, of an initial weight of 150 g/m², the paper including a flame retardant material comprising a product of interaction of nepheline with phosphoric acid and urea, containing (in weight percent):

| | |
|---|---|
| $P_2O_5$ total | 49.0 |
| $P_2O_5$ water-soluble | 3.0 |
| $NH_3$ | 4.3 |
| $Al_2O_3$, $Fe_2O_3$, $Na_2O$, $K_2O$ and other oxides | 18.3 | the flame retardant material content of the paper being 12.0 weight percent, and 1 sheet of paper impregnated with urea-melamine-formaldehyde resin and intended for the compensative layer, of the initial weight of 150 g/m².

The resulting plastic laminate was 3 mm thick and had the following composition, in weight percent:

| | |
|---|---|
| paper for surface layers | 9.0 |
| paper for inner layers | 49.3 |
| phenol-formaldehyde resin | 30.0 |
| urea-melamine-formaldehyde resin | 5.0 |
| flame retardant material | 6.7 |

The plastic laminate exhibited the following characteristics:

| | |
|---|---|
| specific gravity | 1.45 g/cm³ |
| water absorption | 2.3% |
| strength limit at static bending | 1,800 kgf/cm² |
| resistance to boiling in water for one hour | no change in appearance |
| combustibility index K | 0.35 |

EXAMPLE 6

A pack was composed of 1 sheet of paper impregnated with urea-melamine-formaldehyde resin and intended for the outer decorative layer, of an initial weight of 160 g/m².

7 sheets of paper impregnated with phenol-formaldehyde resin and intended for the inner layers, of an initial weight of 150 g/m², the paper including antipyrene representing a product of interaction of nepheline with phosphoric acid and urea, containing (in weight percent):

| | |
|---|---|
| $P_2O_5$ total | 49.0 |
| $P_2O_5$ water-soluble | 3.0 |
| $NH_3$ | 4.3 |
| $Al_2O_3$, $Fe_2O_3$, $Na_2O$, $K_2O$ and other oxides | 18.3 | the flame retardant material content of the paper being 14.0 weight percent, and 1 sheet of paper impregnated with urea-melamine-formaldehyde resin and intended for the comparative layer, of an initial weight of 150 g/m².

The resulting plastic laminate was 1.5 mm thick and had the following composition, in weight percent:

| | |
|---|---|
| paper for surface layers | 14.7 |
| paper for inner layers | 43.0 |
| phenol-formaldehyde resin | 27.0 |
| urea-melamine-formaldehyde resin | 8.3 |
| flame retardant material | 7.0 |

The plastic laminate exhibited the following characteristics:

| | |
|---|---|
| specific gravity | 1.45 g/cm³ |
| water absorption | 2.9% |
| strength limit at static bending | 1,340 kgf/cm² |
| resistance to boiling in water for one hour | no change in appearance |
| combustibility index K | 0.41 |

EXAMPLE 7

A pack was composed of 1 sheet of paper impregnated with melamine-formaldehyde resin and intended for the outer decorative layer, of an initial weight of 150 g/m²

1 sheet of paper impregnated with melamine-formaldehyde resin and intended for the barrier layer, of an initial weight of 150 g/m²

5 sheets of paper impregnated with phenol-formaldehyde resin and intended for the inner layers, of an initial weight of 150 g/m², the paper including a flame retardant material representing a product of interaction of nepheline with phosphoric acid and urea, containing (in weight percent):

| | |
|---|---|
| $P_2O_5$ total | 47.1 |
| $P_2O_5$ water-soluble | 4.03 |
| $NH_3$ | 3.71 |
| $Al_2O_3$, $Fe_2O_3$, $Na_2O$, $K_2O$ and other oxides | 19.8 | the flame retardant material content of the paper being 14.0 weight percent, and 2 sheets of paper impregnated with melamine formaldehyde resin and intended for the compensative layer, of an initial weight of 150 g/m².

The resulting plastic laminate was 1.5 mm thick and had the following composition, in weight percent:

| | |
|---|---|
| paper for surface layers | 26.5 |
| paper for inner layers | 26.7 |
| phenol-formaldehyde resin | 16.5 |
| melamine-formaldehyde resin | 26.0 |
| flame retardant material | 4.3 |

The plastic laminate exhibited the following characteristics:

| | |
|---|---|
| specific gravity | 1.45 g/cm³ |
| water absorption | 2.01% |
| strength limit at static bending | 1,347 kgf/cm² |
| resistance to boiling in water for one hour | no change in appearance |
| combustibility index K | 0.36 |

EXAMPLE 8

A pack was made up of 1 sheet of paper impregnated with melamine-formaldehyde resin and intended for the outer decorative layer, of an initial weight of 160 g/m²

4 sheets of paper impregnated with phenol-formaldehyde resin and intended for the inner layers, of an initial weight of 150 g/m², the paper containing a flame retardant material representing a product of interaction of nepheline with phosphoric acid and urea, containing (in weight percent):

| | |
|---|---|
| $P_2O_5$ total | 48.0 |
| $P_2O_5$ water-soluble | 3.5 |
| $NH_3$ | 4.4 |
| $Al_2O_3$, $Fe_2O_3$, $Na_2O$, $K_2O$ and other oxides | 21.0 | the flame retardant material content of the paper being 15 weight percent, and 1 sheet of paper impregnated with melamine-formaldehyde resin and intended for the compensative layer, of an initial weight of 160 g/m². The resulting plastic laminate was 1 mm thick and had the following composition, in weight percent:

| | |
|---|---|
| paper for surface layers | 22.0 |
| paper for inner layers | 36.2 |
| phenol-formaldehyde resin | 23.0 |
| melamine-formaldehyde resin | 12.4 |
| flame retardant material | 6.4 |

The resulting plastic laminate exhibited the following characteristics:

| | |
|---|---|
| specific gravity | 1.45 g/cm³ |
| water absorption | 2.02% |
| strength limit at static bending | 1,233 kgf/cm² |
| resistance to boiling in water for one hour | no change in appearance |
| combustibility index K | 0.38 |

For the sake of comparison, characteristics of the known plastic with ferriammonium phosphate used as the flame retardant material are given:

| | |
|---|---|
| minimum thickness | 2 mm |
| specific gravity | 1.45 g/cm³ |
| water absorption | 2.5% |

| | |
|---|---|
| strength limit at static bending | 1,250 kgf/cm² |
| resistance to boiling in water for one hour | no change in appearance |
| combustibility index K | 1.3 |

The aforementioned Examples are merely illustrative of specific embodiments of the invention. It should be understood that modifications of the plastic fabrication are possible according to its function and applications.

What we claim is:

1. A laminated material comprising surface layers of paper impregnated with amino-formaldehyde resin and inner layers of paper containing a flame retardant material in an amount of 4 to 8 percent by weight of the total laminate and impregnated with phenol-formaldehyde resin, said flame retardant material being a product of interaction of an aluminum or copper compound with phosphoric acid and nitrogen bases, containing in weight percent:

| | |
|---|---|
| $P_2O_5$ total | 37 to 63 |
| $P_2O_5$ water-soluble | 0 to 6 |
| $NH_3$ | 3.5 to 11 |
| MO | 18 to 43 | wherein MO is at least one metallic oxide, said components of the laminated material being contained therein in the following ratio, in weight percent:

| | |
|---|---|
| paper for surface layers | 9 to 26 |
| paper for inner layers | 26 to 49 |
| phenol-formaldehyde resin | 16 to 30 |
| amino-formaldehyde resin | 5 to 26, | said laminated material having a combustibility index in the range of 0.1 to 0.5.

2. A laminated material as defined in claim 1, wherein the amino-formaldehyde resin content of the impregnated paper for the surface layers of said laminate is 50 weight percent.

3. A laminated material as defined in claim 1, wherein the phenol-formaldehyde resin content of the impregnated paper for the inner layers of said laminate is 35 weight percent.

4. A laminated material as defined in claim 1, wherein said flame retardant is a product of interaction of nepheline with phosphoric acid and nitrogen bases.

5. A laminated material as defined in claim 1, wherein said amino-formaldehyde resin is melamine-formaldehyde resin.

6. A laminated material as defined in claim 5, wherein said flame retardant is a product of interaction of nepheline with phosphoric acid and nitrogen bases.

7. A laminated material comprising surface layers of paper impregnated with amino-formaldehyde resin and inner layers of paper containing a flame retardant material in an amount of 4 to 8 percent by weight of the total laminate and impregnated with phenol-formaldehyde resin, said flame retardant material being a product of interaction of an aluminum or copper compound with phosphoric acid and nitrogen bases, containing, in weight percent:

| | |
|---|---|
| $P_2O_5$ total | 37 to 63 |
| $P_2O_5$ water-soluble | 0 to 6 |
| $NH_3$ | 3.5 to 11 |
| MO | 18 to 43 | where MO is at least one metallic oxide, said components of the laminated material being contained therein in the following ratio, in weight percent:

| | |
|---|---|
| paper for surface layers | 9 to 26 |
| paper for inner layers | 26 to 49 |
| phenol-formaldehyde resin | 16 to 30 |
| amino-formaldehyde resin | 5 to 26, | said laminated material having a combustibility index K in the range of 0.1 to 0.5, and a thickness of from 1 to 3 mm.

* * * * *